(12) United States Patent
Ricci

(10) Patent No.: US 7,293,026 B1
(45) Date of Patent: Nov. 6, 2007

(54) INTEGRATING A DATA WAREHOUSE AND A DATABASE

(75) Inventor: Christopher P. Ricci, Dayton, OH (US)

(73) Assignee: NCR Corp., Dayton, OH (US)

(*) Notice: Subject to any disclaimer, the term of this patent is extended or adjusted under 35 U.S.C. 154(b) by 524 days.

(21) Appl. No.: 10/836,997

(22) Filed: Apr. 30, 2004

(51) Int. Cl.
  *G06F 7/00* (2006.01)
  *G06F 17/00* (2006.01)

(52) U.S. Cl. .......................................... 707/10

(58) Field of Classification Search ................ 707/1–5, 707/10, 101
  See application file for complete search history.

(56) References Cited

U.S. PATENT DOCUMENTS

| | | | |
|---|---|---|---|
| 6,151,601 A * | 11/2000 | Papierniak et al. | 707/10 |
| 6,438,538 B1 * | 8/2002 | Goldring | 707/3 |
| 6,480,850 B1 * | 11/2002 | Veldhuisen | 707/9 |
| 6,574,742 B1 * | 6/2003 | Jamroga et al. | 713/400 |
| 6,611,829 B1 * | 8/2003 | Tate et al. | 707/2 |
| 6,622,152 B1 * | 9/2003 | Sinn et al. | 707/204 |
| 6,671,689 B2 * | 12/2003 | Papierniak | 707/100 |
| 6,934,687 B1 * | 8/2005 | Papierniak et al. | 705/10 |
| 7,051,020 B2 * | 5/2006 | Dettinger et al. | 707/4 |
| 7,096,189 B1 * | 8/2006 | Srinivasan | 705/11 |
| 2004/0098747 A1 * | 5/2004 | Kay et al. | 725/95 |
| 2005/0060193 A1 * | 3/2005 | Lancaster et al. | 705/2 |
| 2005/0086360 A1 * | 4/2005 | Mamou et al. | 709/232 |
| 2006/0242160 A1 * | 10/2006 | Kanchwalla et al. | 707/100 |

* cited by examiner

*Primary Examiner*—Chong H Kim
(74) *Attorney, Agent, or Firm*—Howard Speight

(57) ABSTRACT

A system, method and computer program for integrating a database and a data warehouse are disclosed. A request intended to be run on the database is received. If the request would benefit from a service provided by the data warehouse, data necessary to fulfill the request is transferred from the database to the data warehouse and the request is submitted to the data warehouse. Otherwise, the request is submitted to the database.

29 Claims, 5 Drawing Sheets

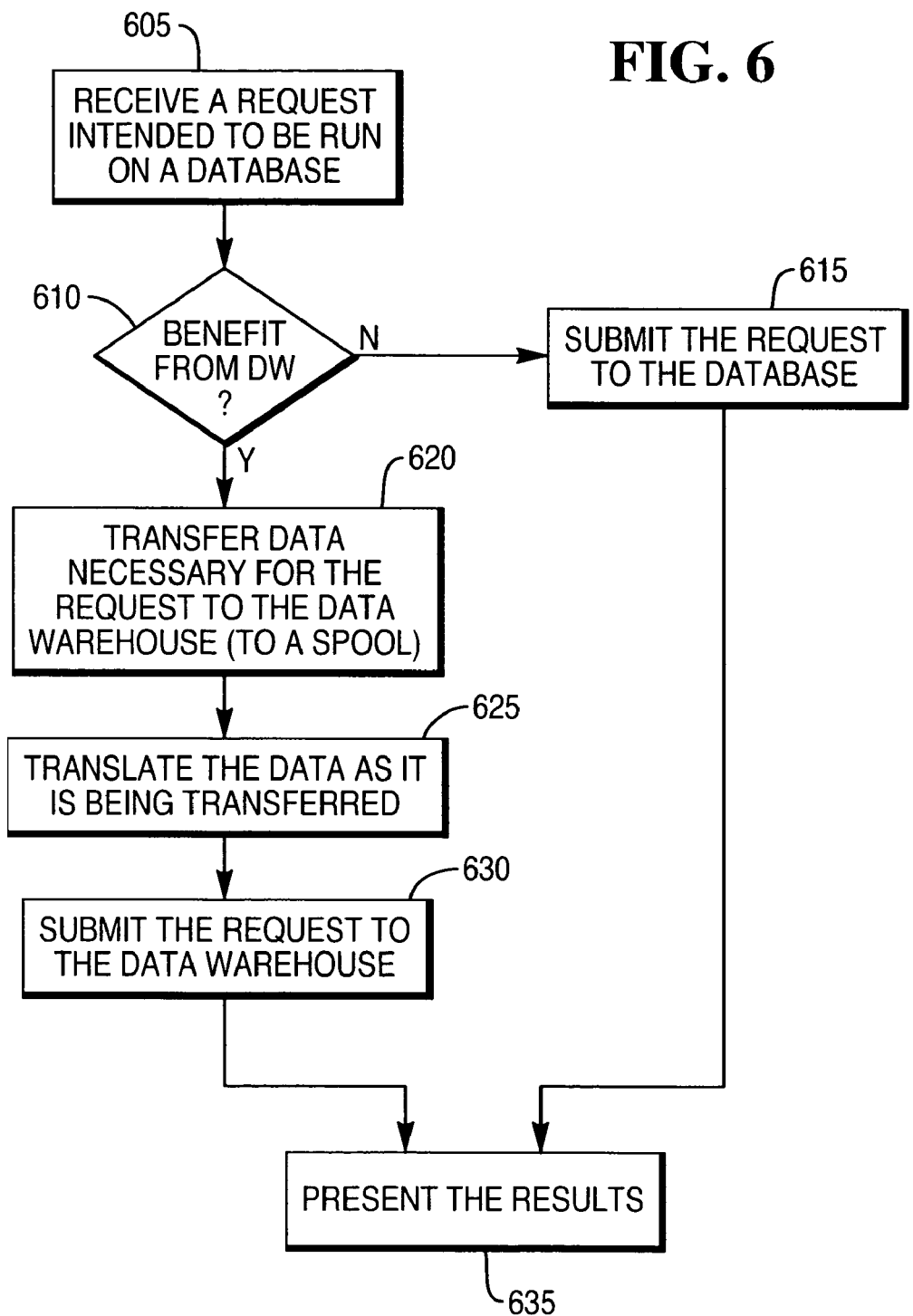

INTEGRATING A DATA WAREHOUSE AND A DATABASE

BACKGROUND

A data warehouse provides significant capabilities that can be useful in performing analysis of a business's data. Generally, however, small and medium size businesses have had less access to data warehouses and their capabilities because of the associated cost and other considerations.

SUMMARY

In general, in one aspect, the invention features a system including an interface. The interface includes a request receiver to receive a request submitted to the database, a data transferor to transfer data necessary to fulfill the request from the database into the data warehouse, and a request submitter to submit the request to the data warehouse.

Implementations of the invention may include one or more of the following. The data transferor may transfer the necessary data into a spool in the data warehouse. The interface may include a data translator to translate the data from a format used by the database to a format used by the data warehouse as the data is being transferred. The interface may include a result presentor to present the data warehouse results. The interface may include a request sorter to determine if the request will benefit from a service provided by the data warehouse. The interface may be part of the data warehouse. The data transferor may transfer data necessary to fulfill the request from a second database into the data warehouse. The data translator may translate the data transferred from the second database from a format used by the second database to a format used by the data warehouse as the data is being transferred. The system may include a virtual private network connecting the database and the data warehouse. The virtual private network may further provide a user interface through which the request is submitted. The interface may include a request sorter. The virtual private network may be arranged so that requests are submitted to a request sorter. The request sorter may cause the other functions of the interface to be performed if the request would benefit from a service provided by the data warehouse. Otherwise, the request sorter may submit the request to the database.

In general, in another aspect, the invention features a method for integrating a database and a data warehouse. The method includes receiving a request intended to be run on the database. If the request would benefit from a service provided by the data warehouse, the method includes transferring data necessary to fulfill the request from the database to the data warehouse and submitting the request to the data warehouse. Otherwise, the method submits the request to the database.

In general, in another aspect, the invention features a computer program, stored on a tangible storage medium, for use in integrating a database and a data warehouse. The program includes executable instructions that cause a computer to receive a request intended to be run on the database. If the request would benefit from a service provided by the data warehouse, the program transfers data necessary to fulfill the request from the database to the data warehouse and submits the request to the data warehouse. Otherwise, the program submits the request to the database.

In general, in another aspect, the invention features a database system including a massively parallel processing system, which includes one or more nodes, a plurality of CPUs, each of the one or more nodes providing access to one or more CPUs, and a plurality of data storage facilities each of the one or more CPUs providing access to one or more data storage facilities. The database system includes a data warehouse including data warehouse data. The data warehouse data is distributed across the data storage facilities of the massively parallel processing system according to a distribution algorithm. The database system further includes a database residing on a computer separate from the massively parallel processing system. The database system further includes a process for integrating the operation of the data warehouse and the database. The process includes receiving a request intended to be run on the database. If the request would benefit from a service provided by the data warehouse, the process includes transferring data necessary to fulfill the request from the database to the data warehouse, distributing the data across the data storage facilities of the massively parallel processing system according to the distribution algorithm, and submitting the request to the data warehouse. Otherwise, if the request would not benefit from a service provided by the data warehouse, the process includes submitting the request to the database.

Implementations of the invention may include one or more of the following. The process may execute on the massively parallel processing system. The process may execute on a second computer.

BRIEF DESCRIPTION OF THE DRAWINGS

FIG. 6 is a flow chart for an interface that integrates a database and a data warehouse.

DETAILED DESCRIPTION

Figure 1:
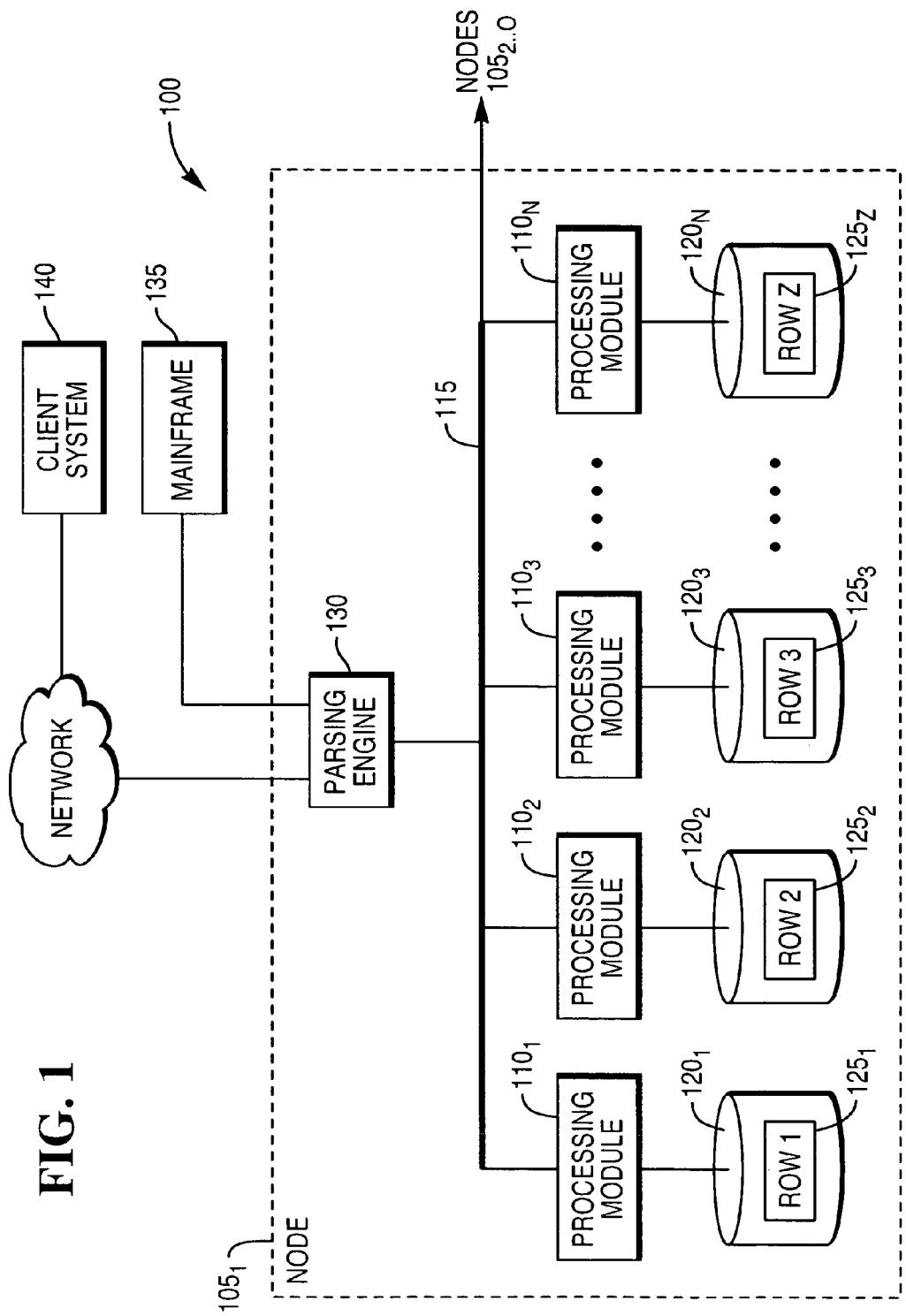
FIG. 1 is a block diagram of a node of a data warehouse system.

The technique for integrating a data warehouse and a database disclosed herein has particular application, but is not limited, to large databases (or data warehouses) that might contain many millions or billions of records managed by a database system ("DBMS") 100, such as a Teradata Active Data Warehousing System available from NCR Corporation. FIG. 1 shows a sample architecture for one node $105_1$ of the DBMS 100. The DBMS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_1 \ldots _N$ manages a portion of a database that is stored in a corresponding one of the data-storage facilities $120_1 \ldots _N$. Each of the data-storage facilities $120_1 \ldots _N$ includes one or more disk drives. The DBMS may include multiple nodes $105_2 \ldots _O$ in addition to the illustrated node $105_1$, connected by extending the network 115.

The system stores data in one or more tables in the data-storage facilities $120_1 \ldots _N$. The rows $125_1 \ldots _Z$ of the tables are stored across multiple data-storage facilities $120_1 \ldots _N$ to ensure that the system workload is distributed evenly across the processing modules $110_1 \ldots _N$. A parsing engine 130 organizes the storage of data and the distribution of table rows $125_1 \ldots _Z$ among the processing modules $110_1 \ldots _N$. The parsing engine 130 also coordinates the retrieval of data from the data-storage facilities $120_1 \ldots _N$ in response to queries received from a user at a mainframe 135 or a client computer 140. The DBMS 100 usually receives queries and commands to build tables in a standard format, such as SQL.

In one implementation, the rows $125_1 \ldots _Z$ are distributed across the data-storage facilities $120_1 \ldots _N$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_1 \ldots _N$ and associated processing modules $110_1 \ldots _N$ by a hash bucket map. The characteristics of the columns chosen for the primary index determine how evenly the rows are distributed. This method for distributing the rows among the data-storage facilities is called a distribution algorithm.

Figure 2:
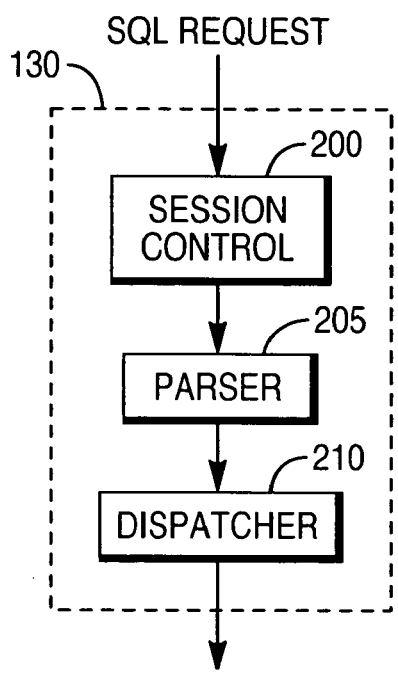
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
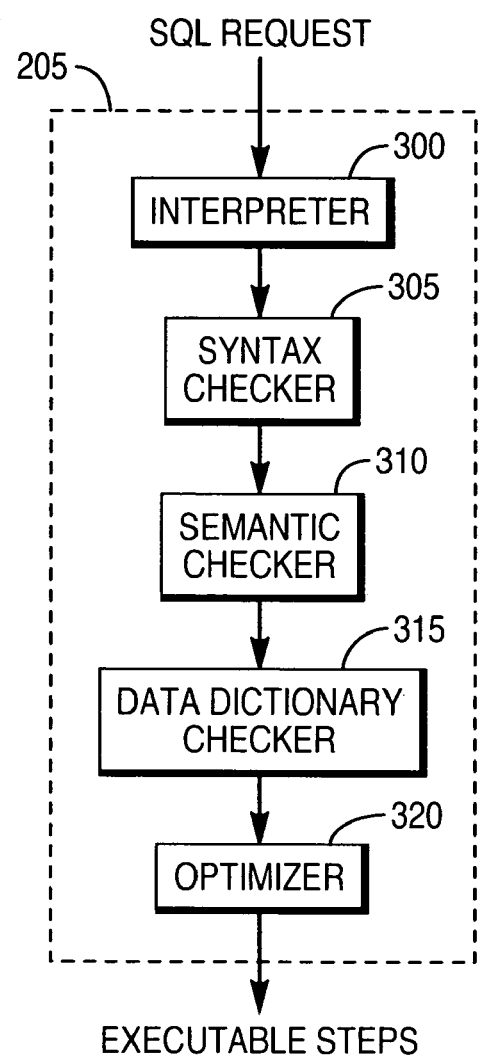
FIG. 3 is a block diagram of a parser.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which generates the least expensive plan to perform the request.

An example system allows integration of disparate databases owned or operated by, for example, small or medium sized businesses with a data warehouse system, such as that shown in FIG. 1. Generally, the databases are disparate in the sense that they are different types of databases (e.g., (a) a relational database versus a non-relational database or (b) different vendor software), or they have different schemas, different data, and/or different data formats. The system accomplishes the integration by providing an interface between the disparate databases and the data warehouse system.

Figure 4:
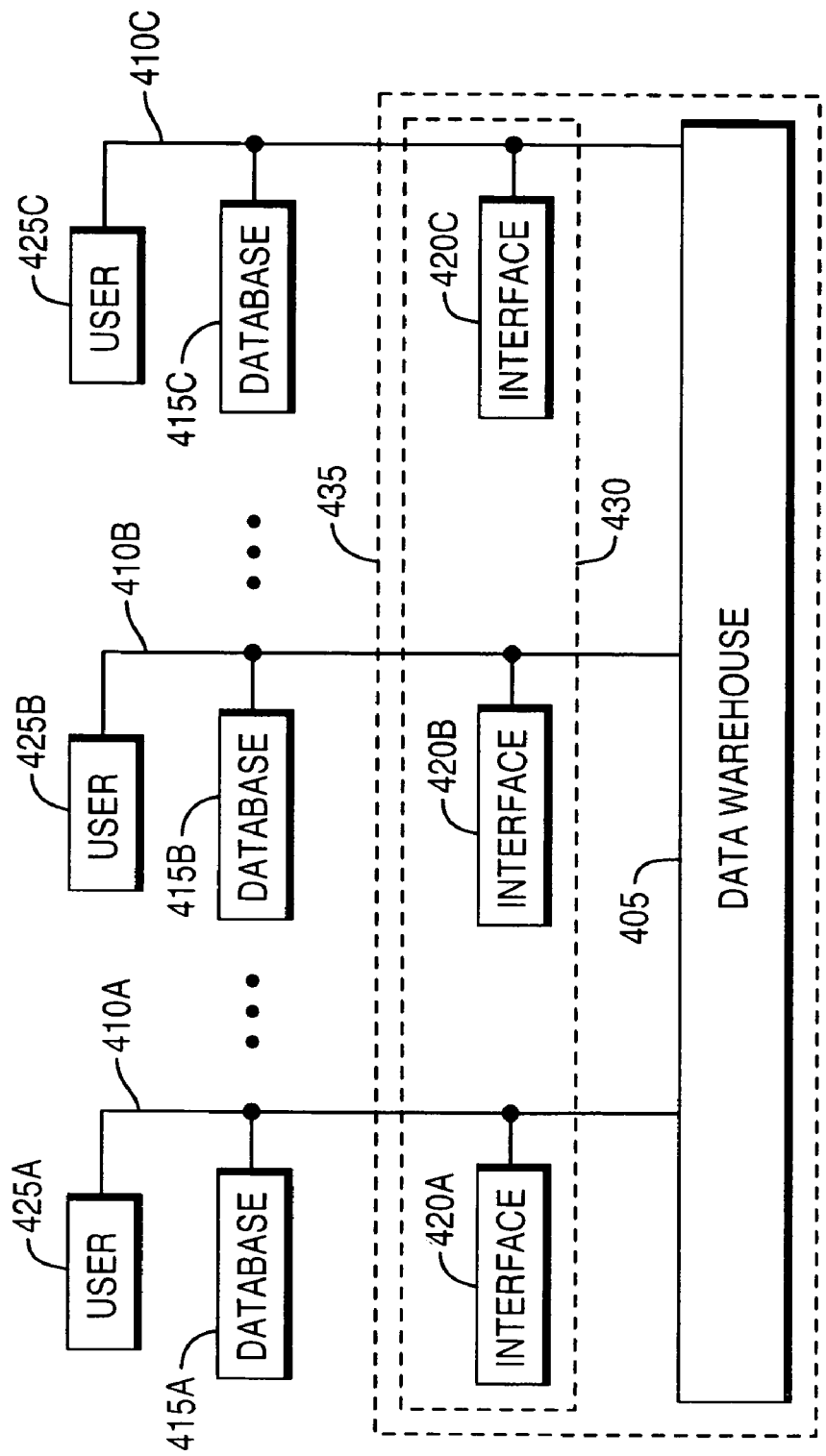
FIG. 4 is a block diagram of a data warehouse interfaced with a plurality of databases.

The integrated data warehouse includes a three-tier architecture, as illustrated in FIG. 4. Data warehouse 405 includes at least one node 100 of a data warehouse, such as that shown in FIG. 1. The data warehouse 405 is connected, for example, by one or more virtual private networks 410a, 410b and 410c, to one or more databases 415a, 415b, 415c. One or more interfaces 420a, 420b, 420c integrate the databases 415a, 415b, 415c with the data warehouse 405. One or more users 425a, 425b, 425c interact with their respective databases 415a, 415b, 415c and interfaces 420a, 420b, and 420c through the virtual private networks 410a, 410b, 410c. The users 425a, 425b, 425c also interact with the data warehouse 405 through the virtual private networks.

The virtual private networks 410a, 410b, 410c may be multiple virtual private networks as shown in FIG. 4 with each virtual private network dedicated to a single business, a smaller set of shared virtual private networks, or a single virtual private network that interconnects all of the blocks shown in FIG. 4.

Further, the interfaces 420a, 420b, 420c may be configured such that there is one interface per database, as illustrated in FIG. 4. Alternatively, the system may have a single interface 430 that integrates all of the databases 415a, 415b, 415c with the data warehouse 405. As yet another alternative, one interface 420a may integrate a single database, e.g. 415a, with the data warehouse while another interface 420b may integrate several databases, e.g. 415b and 415n (not shown).

The interfaces 420a, 420b, 420c may be incorporated into the data warehouse 405 so that the data warehouse would be represented by block 435. Alternatively, each interface 420a, 420b, 420c may be part of its respective database 415a, 415b, 415c.

FIG. 4 shows a single user, e.g. 425a, associated with each database, e.g. 415a. It will be understood that multiple users may be attached to the virtual private network 410a for a database 415a integrated with a data warehouse 405.

The interfaces 420a, 420b, 420c allow data to be transferred between the databases 415a, 415b, 415c and the data warehouse 405. If necessary, the interfaces 420a, 420b, 420c translate the data as it is being transferred. For example, a database 415a and the data warehouse 405 may differ in data format, in database format, in schema or in a variety of other ways that would occur to a person of ordinary skill.

In one example system, each interface consists of software modules that transfer data between the databases 415a, 415b, 415c and the data warehouse 405 and perform the necessary translations to resolve the differences between the databases and the data warehouse. For example, each interface may provide communication modules and message handlers to facilitate the transfer of data between the databases. Further, each interface may provide processes to translate the data as it is being transferred. Such processes may be capable of, for example, generating differential files, which store the differences between the data warehouse 405 and the databases 415a, 415b, 415c, and proving mapping between the different data and database schemas used by the data warehouse 405 and the databases 415a, 415b, 415c. In general, the translation involves reconciling, integrating and removing semantic heterogeneity among the data stored in the data warehouse 405 and the databases 415a, 415b, 415c. Translation may include, for example, accounting for the differences in the various export schemes employed by the databases 415a, 415b, 415c and integrating the external data into an integrated data scheme for storage on the data warehouse.

All of a business's data may reside in its database, e.g. database 415a, or the business's data may be divided, with some of its data permanently stored in its database 415a and some of its data permanently stored in the data warehouse 405. Once the necessary data for a request from a database, e.g. 415*a*, is integrated into the data warehouse 405, the user of that database has a consistent and reconciled view of all of the data existing in the business including data stored in the data warehouse 405.

The database data transferred to the data warehouse 405 may be stored in permanent storage in the data warehouse 405 and thereby incur storage costs from the owner or operator of the data warehouse 405. More likely, however, the database data transferred to the data warehouse 405 is stored only temporarily, in a spool for example. The transferred data is allowed to expire after the request is executed. Consequently, the storage costs associated with running the query on the data warehouse may be reduced because the data is not stored permanently.

Once the data is transferred to the data warehouse 405 it is distributed among the processing modules 1101 . . . N and data storage facilities 1201 . . . N, using the distribution algorithm and partitioning techniques described above with respect to FIG. 1. After the data is transferred to the data warehouse 405, all or some of the services provided by the data warehouse may be brought to bear in executing the request, thereby improving performance.

Not all requests will benefit from the services provided by the data warehouse 405. The interfaces 420*a*, 420*b*, 420*c* determine when a request is to be run against one of the databases 415*a*, 415*b*, 415*c*, determine whether the request would benefit from a service provided by the data warehouse 405, transfer data necessary to execute the request from the databases 415*a*, 415*b*, 415*c* to the data warehouse 405, translating where necessary, and execute the query on the data warehouse 405.

Figure 5:
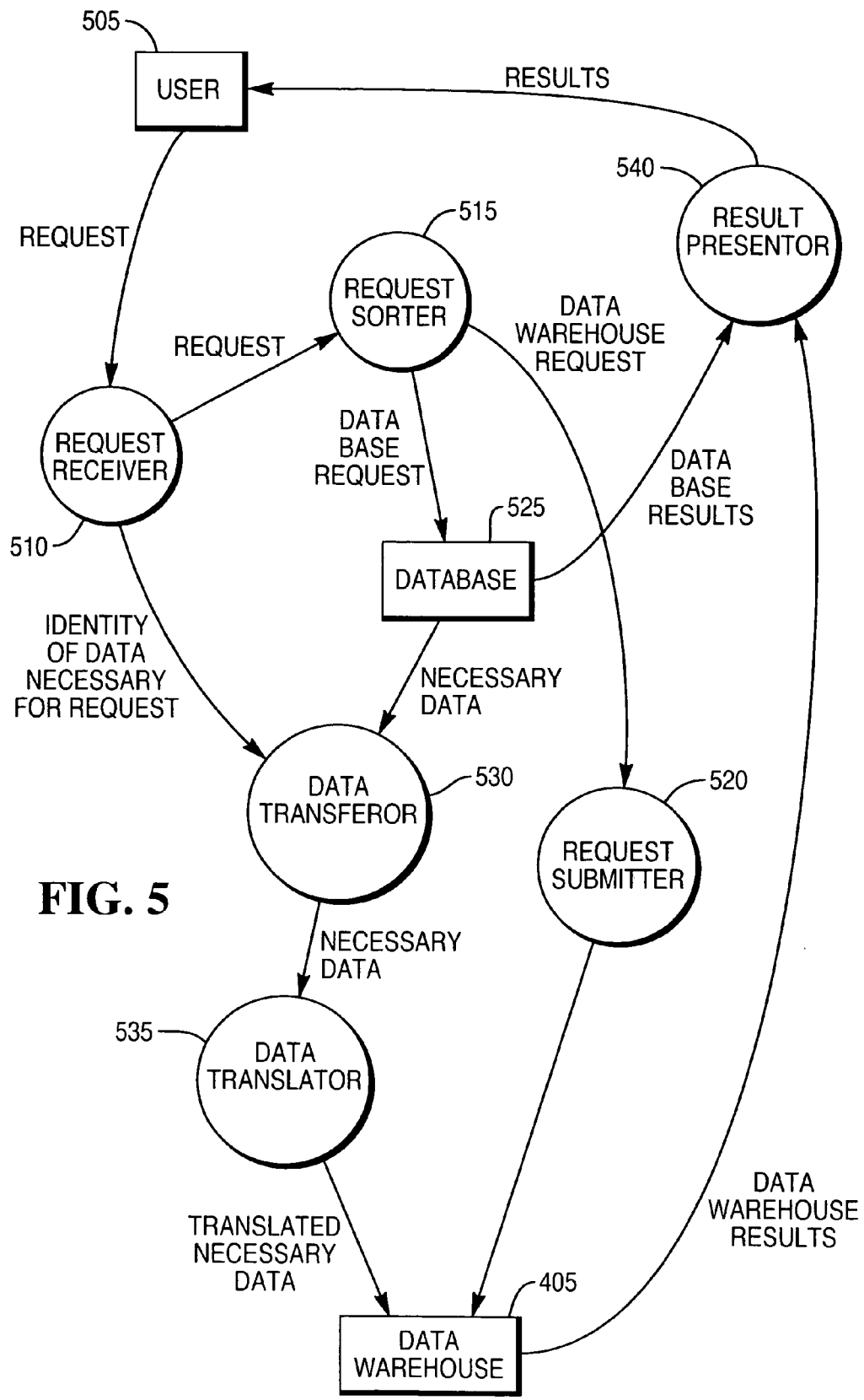
FIG. 5 is a data flow diagram showing the flow of data in an interface.

A data flow diagram illustrating an example flow of data within an example interface is illustrated in FIG. 5. A user 505 issues a request that is processed within the interface by a request receiver 510. The request receiver 505 passes the request to a request sorter, which determines whether the request will benefit from the services provided by the data warehouse 405. If so, the request sorter 515 passes the request to the data warehouse through a request submitter 520, which submits the request to the data warehouse 405. Otherwise, the request sorter 515 submits the request to the database 525, which is, for example, one of the disparate databases 415*a*, 415*b*, 415*c*.

If the request is submitted to the data warehouse 405, the request receiver 510 determines the identity of the data necessary to execute the request and passes that information to a data transferor 530. The data transferor 530 extracts the necessary data from the database 525 and submits it to a data translator 535, if translation is necessary. The translated data is then stored in the data warehouse 405.

Depending on where it was submitted, the request is executed by either the database 525 or the data warehouse 405. In either case results are produced and provided to a result presentor 540, which presents the results to the user.

In operation, as shown in FIG. 6, the system shown in FIG. 4 receives a request intended to be run on one of the disparate databases (block 605). For example, a user may wish to submit a request to the business database, such as a query to determine the revenues its business has experienced over a period of time categorized in such a way that will assist the user in making a business decision. All of the data necessary for the query may be stored on the business database. Alternatively, some of the data may be stored on the business database and some may be stored in the data warehouse. In some cases, all of the data necessary for the query may already be stored in the data warehouse.

The system then determines if executing the request will benefit from a service provided by the data warehouse 405 (block 610). For example, if the query requires a join that would benefit from parallel processing or partitioning such as that described above, the system will likely determine that the query would benefit from a data warehouse service. In that case, the system will submit the query to the data warehouse. Otherwise, if the query would not benefit from a service provided by the data warehouse 405 or if the benefit would not justify the overhead associated with involving the data warehouse 405, the system submits the query to the database (block 615).

If the system determines that the request would benefit from a service provided by the data warehouse 405, the system transfers the data necessary for the request to the data warehouse 405 (block 620). In some cases, as described above, the necessary data is transferred into permanent storage in the data warehouse 405. In other cases, the necessary data is transferred into temporary storage, such as a spool, for only the time necessary to execute the request.

If translation of the data is necessary, the system translates the data as it is being transferred (block 625). The request is then submitted to the data warehouse for execution (block 630).

In either case, whether the request is executed by the database or by the data warehouse, the results are presented to the user (block 635).

The text above described one or more specific embodiments of a broader invention. The invention also is carried out in a variety of alternative embodiments and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system including:
   a memory; and
   an interface including:
   a request receiver to receive a request submitted to a database;
   a request sorter to determine if the request will benefit from a service provided by a data warehouse;
   a data transferor triggered by the request sorter, if the request will benefit from a service provided by the data warehouse, to transfer data necessary to fulfill the request from the database into the data warehouse;
   a request submitter triggered by the request sorter, if the request will benefit from a service provided by the data warehouse, to submit the request to the data warehouse; and
   a result presentor to receive a result from the data warehouse in response to the request if the request will benefit from a service provided by the data warehouse and otherwise to receive the result from the database and to present the result.

2. The system of claim 1 where:

the data transferor transfers the necessary data into a spool in the data warehouse.

3. The system of claim 1 further including:

a data translator to translate the data from a format used by the database to a format used by the data warehouse as the data is being transferred.

4. The system of claim 1 where:

the interface is part of the data warehouse.

5. The system of claim 1 further including:

the data transferor to transfer data necessary to fulfill the request from a second database into the data warehouse; and the data translator to translate the data transferred from the second database from a format used by the second database to a format used by the data warehouse as the data is being transferred.

6. The system of claim 1 further including:

a virtual private network connecting the database and the data warehouse;

the virtual private network further providing a user interface through which the request is submitted.

7. The system of claim 6 where:

the virtual private network is arranged so that requests are submitted to the request sorter;

the request sorter submits the request to the database if the request would not benefit from a service provided by the data warehouse.

8. A method for integrating a database and a data warehouse, the method including:

receiving a request intended to be run on the database;

if the request would benefit from a service provided by the data warehouse:

transferring data necessary to fulfill the request from the database to the data warehouse;

submitting the request to the data warehouse; and receiving a result from the data warehouse in response to the request;

otherwise:

submitting the request to the database; and receiving a result from the database in response to the request; presenting the result.

9. The method of claim 8 where:

transferring data includes transferring the necessary data into a spool in the data warehouse.

10. The method of claim 8 further including:

translating the data from a format used by the database to a format used by the data warehouse as the data is being transferred.

11. The method of claim 8 further including:

determining if the request will benefit from a service provided by the data warehouse.

12. The method of claim 8 further including:

transferring data necessary to fulfill the request from a second database into the data warehouse;

translating the data transferred from the second database from a format used by the second database to a format used by the data warehouse as the data is being transferred.

13. The method of claim 8 further including:

connecting the database and the data warehouse using a virtual private network;

providing a user interface through which the request is submitted into the virtual private network.

14. A computer program, stored on a tangible storage medium, for use in integrating a database and a data warehouse, the program including executable instructions that cause a computer to:

receive a request intended to be run on the database;

if the request would benefit from a service provided by the data warehouse:

transfer data necessary to fulfill the request from the database to the data warehouse;

submit the request to the data warehouse; and receive a result from the data warehouse in response to the request;

otherwise:

submit the request to the database; and receive a result from the database in response to the request; present the result.

15. The computer program of claim 14 where, when transferring data, the computer:

transfers the necessary data into a spool in the data warehouse.

16. The computer program of claim 14 further including executable instructions that cause a computer to:

translate the data from a format used by the database to a format used by the data warehouse as the data is being transferred.

17. The computer program of claim 14 further including executable instructions that cause a computer to:

determine if the request will benefit from a service provided by the data warehouse.

18. The computer program of claim 14 further including executable instructions that cause a computer to:

transfer data necessary to fulfill the request from a second database into the data warehouse;

translate the data transferred from the second database from a format used by the second database to a format used by the data warehouse as the data is being transferred.

19. The computer program of claim 14 further including executable instructions that cause a computer to:

connect the database and the data warehouse using a virtual private network;

provide a user interface through which the request is submitted into the virtual private network.

20. A database system including:

a massively parallel processing system including:

one or more nodes;

a plurality of CPUs, each of the one or more nodes providing access to one or more CPUs;

a plurality of data storage facilities each of the one or more CPUs providing access to one or more data storage facilities;

a data warehouse including data warehouse data, the data warehouse data being distributed across the data storage facilities of the massively parallel processing system according to a distribution algorithm;

a database residing on a computer separate from the massively parallel processing system;

a process for integrating the operation of the data warehouse and the database, the process including:

receiving a request intended to be run on the database;

if the request would benefit from a service provided by the data warehouse:

transferring data necessary to fulfill the request from the database to the data warehouse;

distributing the data across the data storage facilities of the massively parallel processing system according to the distribution algorithm; and submitting the request to the data warehouse;

otherwise:

submitting the request to the database.

21. The database system of claim 20 where:

the process executes on the massively parallel processing system.

22. The database system of claim 20 where:

the process executes on a second computer.

23. The database system of claim 20 where:

the computer and the massively parallel processing system are connected by a virtual private network.

24. The database system of claim 20 where:

transferring data includes transferring the necessary data into a spool in the data warehouse.

25. The database system of claim 20 where the process further includes:

translating the data from a format used by the database to a format used by the data warehouse as the data is being transferred.

26. The database system of claim 20 where the process further includes:

presenting the data warehouse results.

27. The database system of claim 20 where the process further includes:

determining if the request will benefit from a service provided by the data warehouse.

28. The database system of claim 20 where the process further includes:

transferring data necessary to fulfill the request from a second database into the data warehouse;

translating the data transferred from the second database from a format used by the second database to a format used by the data warehouse as the data is being transferred.

29. The database system of claim 20 further including:

a virtual private network connecting the database and the data warehouse;

the virtual private network providing a user interface through which the request is submitted.

* * * * *